US006501851B1

United States Patent
Kondo et al.

(10) Patent No.: US 6,501,851 B1
(45) Date of Patent: Dec. 31, 2002

(54) IMAGE ENCODING/DECODING BY ELIMINATING COLOR COMPONENTS IN PIXELS

(75) Inventors: Tetsujiro Kondo, Tokyo (JP); Naoki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/206,415

(22) Filed: Dec. 7, 1998

(30) Foreign Application Priority Data

Dec. 9, 1997 (JP) ............................................. 9-338316

(51) Int. Cl.⁷ .............................. H04N 1/46; G06K 9/36
(52) U.S. Cl. ........................................ 382/162; 358/518
(58) Field of Search ............................... 358/539, 518, 358/523; 382/167, 162

(56) References Cited

U.S. PATENT DOCUMENTS

| 5,383,037 A | | 1/1995 | Kimura et al. ............... 358/539 |
| 5,566,002 A | | 10/1996 | Shikakura .................... 358/443 |
| 5,768,481 A | * | 6/1998 | Chan ........................... 395/102 |
| 5,930,387 A | * | 7/1999 | Chan ........................... 382/166 |
| 6,016,360 A | * | 1/2000 | Nguyen ....................... 382/166 |
| 6,115,496 A | * | 9/2000 | Nguyen ....................... 382/166 |
| 6,333,745 B1 | * | 12/2001 | Shimomura ................. 345/535 |

FOREIGN PATENT DOCUMENTS

| EP | 0674428 A2 | * | 9/1995 | ............ H04N/1/52 |
| EP | 0923052 | * | 6/2002 | ............ G06T/9/00 |
| JP | 05137010 | * | 6/1993 | ............ H04N/1/46 |

* cited by examiner

*Primary Examiner*—Jerome Grant, II
(74) *Attorney, Agent, or Firm*—Frommer Lawrence & Haug LLP; William S. Frommer; Glenn F. Savit (57) ABSTRACT

During an encoding operation, one of the R, G, B components of a pixel in the image are eliminated. In a first pixel, the B component is eliminated, and then in a second pixel which is to the right of the first pixel, the R component is eliminated. Further, in a third pixel to the right of the second pixel, the G component is eliminated. In the same manner, R, G, B components are thereafter eliminated in a three-pixel cycle. During a decoding operation, an estimated value of a color component that was eliminated in the pixel is determined on the basis of the color components of adjacent pixels. A correction value is then computed based on the color components of the adjacent pixels. As a result, the estimated value of the eliminated color component is adjusted using the computed correction value to produce a good quality image.

39 Claims, 12 Drawing Sheets

ORIGINAL IMAGE

PIXEL

FIG. 4B

SELECTED IMAGE

SELECTING

IMAGE ENCODING/DECODING BY ELIMINATING COLOR COMPONENTS IN PIXELS

BACKGROUND OF THE INVENTION

The present invention relates to image encoding and decoding apparatus and method and recording media, and in particular, to image encoding and decoding apparatus and method, and an image recording medium for obtaining a decoded image of relatively good quality while preventing an increase in the amount of data.

It is well known that images have a large amount of data. Accordingly, in general, the images are encoded (compressed) before being transmitted or recorded. When the encoding (color compression) of an image having a plurality of color components (a red-green-blue (RGB) 4:4:4 image, for example) is performed, there may be a case where one pixel (24 bits) is vector-quantized to form 8 bits where each of the R, G and B components has 8 bits. In this case, at a decoding section, a decoded image having only up to 256 ($2^8$=28) colors is obtained. This is because the average number of bits assigned to one color component is 8/3 bits. Accordingly, by increasing the number of bits assigned to one color component, deterioration in the quality of the decoded image can be suppressed. However, the amount of data also, increases in correspondence with the increase in the number of bits.

SUMMARY OF THE INVENTION

The present invention has been made in view of the foregoing circumstance, and provides a decoded image with high quality without the increase in the amount of data.

In a method for encoding image data including a plurality of pixels wherein each pixel comprises N color components, one color component is eliminated in the N color components to select N−1 color components. The selected N−1 color components are then encoded.

According to one aspect of the present invention, each of the N color components is eliminated periodically.

In a method for producing a decoded image from encoded data generated by encoding image picture that includes a plurality of pixels wherein each pixel comprises N color components and the encoded data is generated by encoding N−1 color components selected by eliminating one color component from the N color components, the encoded data is decoded to generate the N−1 color components for each pixel. The eliminated one color component is generated based on the generated N−1 color components that are adjacent the eliminated one color component. A pixel is produced based on the generated N−1 color components and the eliminated one color component that has been generated.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS

Figure 1:
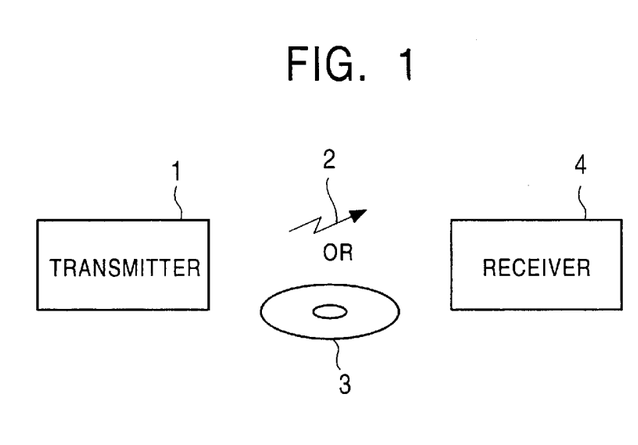
FIG. 1 is a block diagram of one embodiment of a transmission system to which the present invention is applied.

FIG. 1 shows one embodiment of a transmission system (a logical set of devices which may be or may not be in the same enclosure) to which the present invention is applied. An image to be encoded (which may be either a moving image or a still image), an image having, for example, a number of color components, such as an RGB (4:4:4) digital image, is input to a transmitter 1. Here, by way of an example, 8 bits are assigned to each of the R, G and B components to be supplied to the transmitter 1.

Figure 2A:
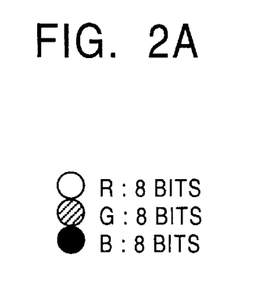
FIGS. 2A and 2B illustrate processing by the transmitter 1 of FIG. 1.
Figure 2B:
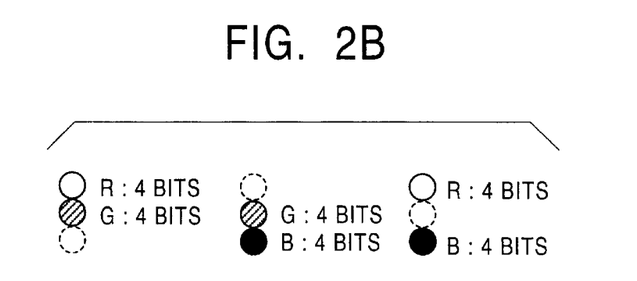

The transmitter 1 encodes the input image, using, for example, 8 bits for one pixel. As shown in FIG. 2A, eight bits are assigned to each of the R, G and B components included in the image provided to the transmitter 1. As shown in FIG. 2B, the transmitter 1 eliminates one color component among the three color components (R, G and B) constituting one pixel, and selects the remaining two color components. Each of the selected two color components is encoded (compressed) using 4 bits, whereby data having 8 bits per pixel are output as encoded data.

The transmitter 1 periodically eliminates R, G and B components. Specifically, by way of an example, referring to one pixel as shown in FIG. 2A, a blue (B) component is eliminated in FIG. 2B. In the pixel to the right in FIG. 2B, a red (R) component is eliminated. In the pixel to the further right in FIG. 2B, a green (G) component is eliminated. In this manner, R, G and B components are eliminated in a three-pixel cycle. Accordingly, color-component elimination/selection is performed for each pixel. Color-component elimination/selection may be performed, for example, every two or three pixels. In other words, after color-component elimination/selection for one pixel is performed, it is possible that color-component elimination/ selection for the next one or two pixels is not undertaken such that the color-component elimination/selection for every third pixel is continuously performed. In this case, concerning a pixel for which the color-component elimination/selection was not performed, the pixel is converted into 8 bits by performing, for example, vector quantization, similar to the conventional case.

As illustrated in FIG. 1, the encoded data having 8 bits per pixel, obtained as described above, are transmitted via a transmission link 2 such as a satellite link, terrestrial waves, a cable television network, or the Internet. Alternatively, the encoded data are recorded on a recording medium 3 such as a magnetic disk, a magnetic tape, or a phase-change disk. The encoded data transmitted via the transmission link 2 are received by the receiver 4. Alternatively, the encoded data recorded on the recording medium 3 are reproduced by the receiver 4. The receiver 4 decodes the encoded data as follows.

The two selected color components for each pixel each are decoded by the receiver 4 to have the original 8 bits. Among the R, G and B components, one color component eliminated by the transmitter 1 is generated based on color components of adjacent pixels by the receiver 4. An image composed of the resultant three color components (R, G and B) is output as a decoded image.

Figure 3:
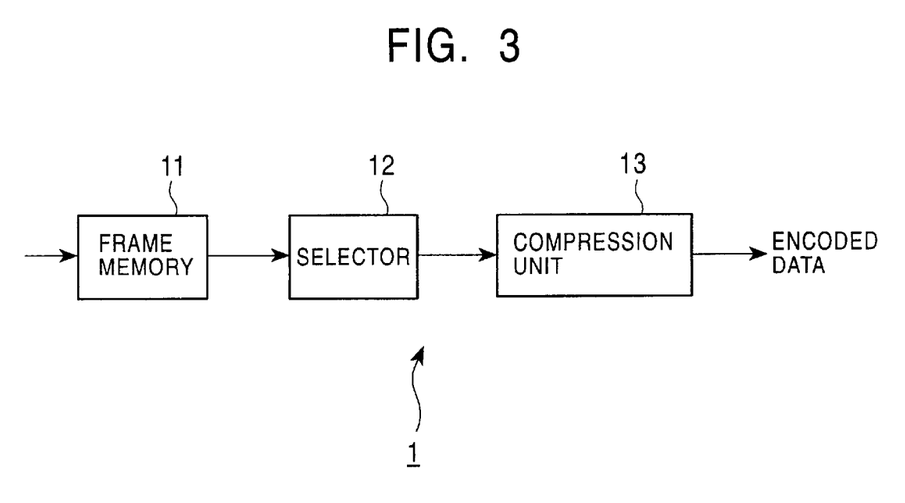
FIG. 3 is a detailed block diagram of the transmitter 1 of FIG. 1.

FIG. 3 shows a block diagram of the transmitter 1 shown in FIG. 1. A 4:4:4 digital image to be encoded in which 8 bits are assigned to each of the R, G and B components is supplied to a frame memory 11. The frame memory 11 stores the supplied image in units of frames, for example. The selector 12 reads image data stored in the frame memory 11 in the order of raster scanning, for example, and periodically eliminates one component among the R component, G component and B component constituting each pixel, and selects and outputs the other two components to a compression unit 13. The compression unit 13 processes the image data supplied from the selector 12 by using, for example, compression encoding such as adaptive dynamic range coding (ADRC) for each color component, and outputs the processed result as encoded data.

Next, the operation of the transmitter 1 will be described. An RGB digital image is supplied to the frame memory 11, and the image data are stored in units of frames. The selector 12 reads the image data stored in the frame memory 11 in the order of raster scanning, and periodically eliminates one component among the R component, G component and B component constituting each pixel, and selects and outputs the other two components to the compression unit 13, as described with reference to FIG. 2B.

Figure 4A:
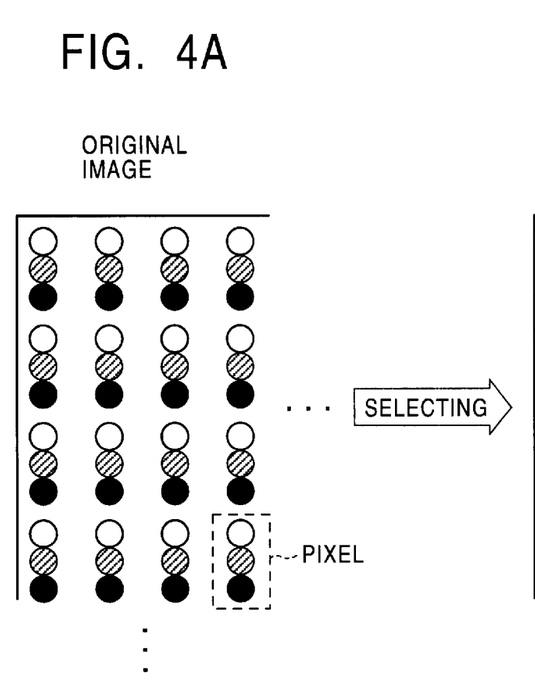
FIGS. 4A and 4B illustrate processing by selector 13 of FIG. 3.

Thereby, as shown in FIG. 4A, an original image composed of pixels having 8-bit R, G and B components is converted into an image composed of pixels that do not include one color component among the R, G and B components. Namely, an image (hereinafter referred to as a "selected image") in which only two color components are selected from the R, G and B components of each pixel is formed.

Figure 4B:
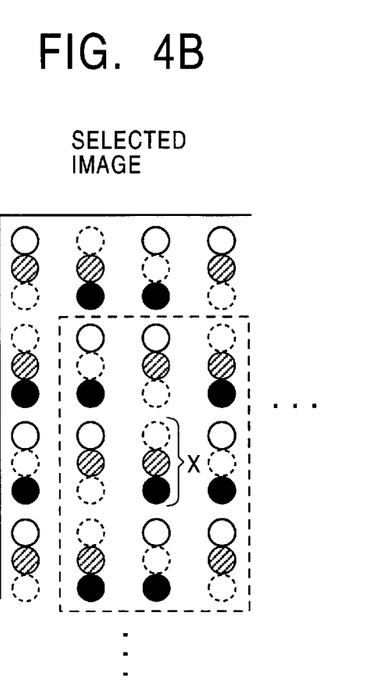

In the embodiment shown in FIGS. 4A and 4B, the image is such that in both the horizontal and vertical directions and accordingly in the diagonal direction one color component among the R, G and B components is periodically eliminated.

Figure 5A:
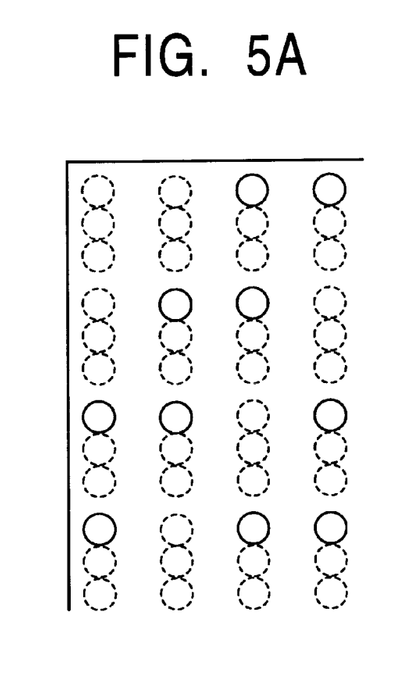
FIGS. 5A–SC show the respective R, G, B components in the selected image shown in FIGS. 4A and 4B.
Figure 5B:
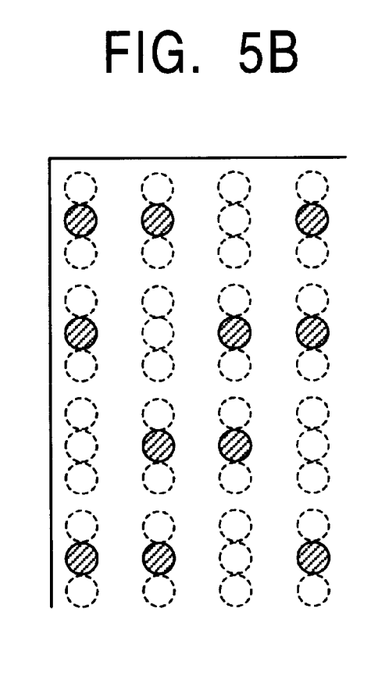
Figure 5C:
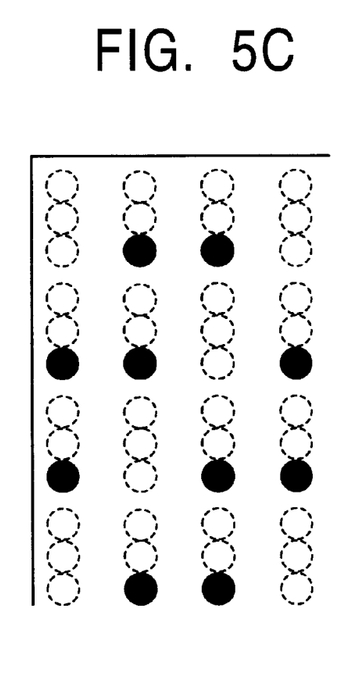

Referring to the selected image shown in FIG. 4B, the R, G and B components are shown individually in FIGS. 5A to 5C. As shown in FIGS. 5A to 5C, in the selected image, in both the horizontal and vertical directions, either the R component, the G component or the B component is eliminated every three pixels. The positions (phases) of the pixels without the R component, the G component and the B component are shifted.

Continuing further with the operation in the transmitter 1, the selected image is supplied to the compression unit 13 as described above. The compression unit 13 processes each color component of the selected image by ADRC, whereby encoded data is formed in which the number of bits assigned to one pixel is 8.

ADRC is a technique by which an image is divided into blocks and each block unit is compressed. In the ADRC, among pixels constituting one block, a maximum value MAX and a minimum value MIN are initially detected and the difference between the maximum value MAX and the minimum value MIN is determined as a local dynamic range of the block (DR=MAX−MIN). Based on the dynamic range DR, the levels of the pixels constituting the block are re-quantized to form K bits.

Further, according to the ADRC, the minimum level MIN is subtracted from each pixel level in the block, and the subtracted value is divided by DR/2K. The obtained quotient is converted into the corresponding code (ADRC code). Specifically, when K=2 for example, it is determined as to which of the ranges obtained by dividing the dynamic range DR by 4 ($2^2$) the quotient belongs. When the quotient belongs to, the bottom level range, the second lowest level range, the third lowest level range, or the top level range for example, it is converted into a 2-bit code such as 00B, 01B, 10B or 11B (where B represents a binary number). At the decoding side, the decoding can be performed by converting ADRC code 00B, 01B, 10B or 11B into the central value $L_{00}$ of the bottom level range obtained by dividing by 4 the dynamic range DR, the central value $L_{01}$ of the second lowest level range, the central value $L_{10}$ of the third lowest level range, or the central value $L_{11}$ of the top level range, and adding the minimum level MIN to the obtained value.

The details of ADRC are disclosed in U.S. Pat. No. 4,703,352 which has been issued on Oct. 27, 1987 and is assigned to the present applicant.

The compression unit 13 processes the selected image by using, for example, 4-bit ADRC for each color component. Namely, the compression unit 13 encodes an 8-bit color component L into a 4-bit code Q based on the following equation:

$$Q=INT\,[L(2n-1)/DR+0.5] \qquad (1)$$

where INT is a function for rounding off a value in the brackets by deleting decimals, and n represents the maximum number of bits (the above-described K) of the ADRC code Q, and is set to 4 as an example. In equation (1), one entire frame is treated as one block, the maximum value MAX is set to 255 ($2^8-1$), and the minimum value MIN is set to 0 ($2^0-1$). Thus, DR (MAX−MIN) is 255; and in this case it is not necessary to transmit the subcodes of the maximum value MAX, the minimum value MIN and the dynamic range DR. Alternatively, if the ADRC is performed for each local block, it is necessary to transmit the subcodes. In this case, the amount of data for the transmission of the subcodes will correspondingly increase. If the compression is performed for each local block, instead of performing the ADRC, the quantization may be performed for each local block.

The compression unit 13 processes each color component as described above by 4-bit ADRC. Because each pixel has only two color components among the R, G and B components, the number of assigned bits per pixel is 8 in the encoded data which is output by the compression unit 13.

Figure 6:
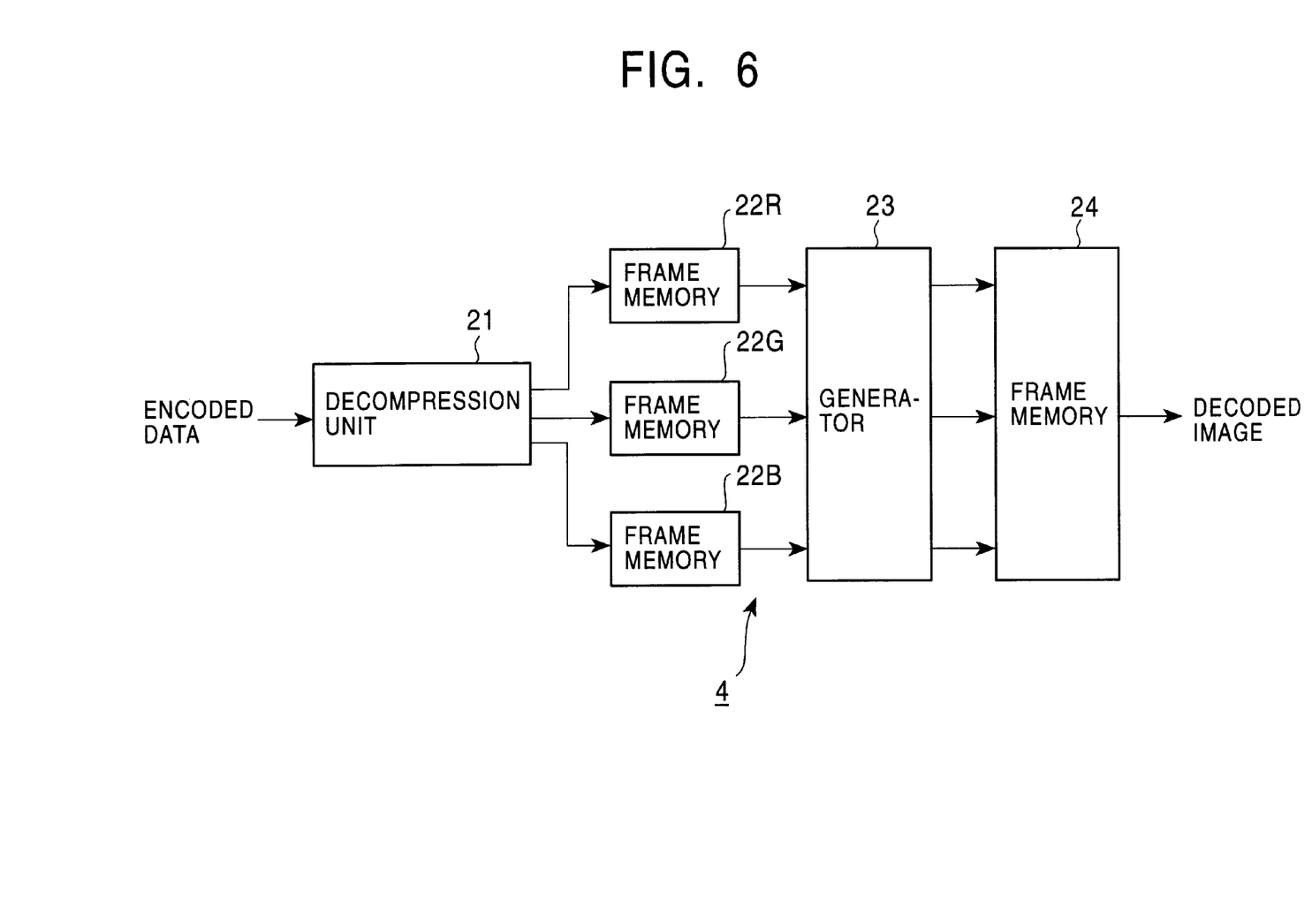
FIG. 6 is a detailed block diagram of receiver 4 of FIG. 1.

FIG. 6 shows in detail a block diagram of the receiver 4 of FIG. 1. The encoded data are supplied to a decompression unit 21. The decompression unit 21 decodes the encoded data, namely, the ADRC code in this embodiment, into a selected image, and supplies R, G and B components in each pixel (any of the R, G and B components may not be included in each pixel) in the selected image to frame memories 22R, 22G and 22B, respectively. The frame memories 22R, 22G and 22B store the R, G and B components supplied from the decompression unit 21 at addresses corresponding to the pixels. A generator 23 reads from the frame memories 22R to 22B adjacent color components including pixels to be decoded (hereinafter referred to as a "pixel to be considered"). And then the generator 23 generates a color component not included in the pixel to be considered based on the retrieved color components and supplies the generated color component to a frame memory 24, together with the two color components included in the pixel to be considered. The frame memory 24 stores the R, G and B components of each pixel supplied from the generator 23 at the address corresponding to that pixel. When storing the pixels for one frame, the frame memory 24 outputs as a decoded image an image composed of the pixels for one frame.

Next, the processing by the above elements in FIG. 6 will be described. The encoded data are supplied to the decompression unit 21, in which, from the ADRC code Q as the encoded data, each of the R, G and B components L is found. That is, one entire frame is treated as one block and the decompression unit 21 decodes the 4-bit ADRC code Q into the color component L based on the following equation:

$$L = INT[*DR/(2n-1) + 0.5] \quad (2)$$

The R, G and B components decoded by the decompression unit 21 are supplied to the frame memories 22R, 22G and 22B, respectively. This decompression operation corresponds to an operation of the compression unit 13 in the transmitter 1. Therefore, when another compression operation in the compression unit 13, that is, the quantization for each local block, is performed, the corresponding decompression operation is performed in the decompression unit 21.

The generator 23 reads from the frame memories 22R to 22B the adjacent color components, and generates based on the read color components the color component not included in the pixel to be considered. Namely, the generator 23 computes, for example, a weighting sum (an average value, etc.) of the color components of the pixels adjacent the pixel to be considered, and uses the computed result as the color component not included in the pixel to be considered. The generator 23 supplies the generated color component to the frame memory 24, together with the two color components included in the pixel to be considered. In the frame memory 24, the R, G and B components supplied from the generator 23, namely, the R, G and B components constituting the pixel to be considered are stored. For other pixels included in the frame to be processed, the same processing is continuously performed thereafter, whereby when the pixels for one frame are stored in the frame memory 24 the image composed of the pixels for one frame is output as a decoded image.

As described above, the component not included in the pixel to be considered is generated from color components of the adjacent pixels (including color components included in the pixel to be considered). Thus, a decoded image expressed using colors more than 256 ($2^8$) can be obtained.

In the case where a weighting sum of the pixels adjacent the pixel to be considered is used as a color component not included in the pixel to be considered, so-called averaging is performed; and when the original image has an edge or stripe pattern, the edge or stripe pattern is damaged and the image quality deteriorates. The present invention solves this problem as follows.

Figure 7:
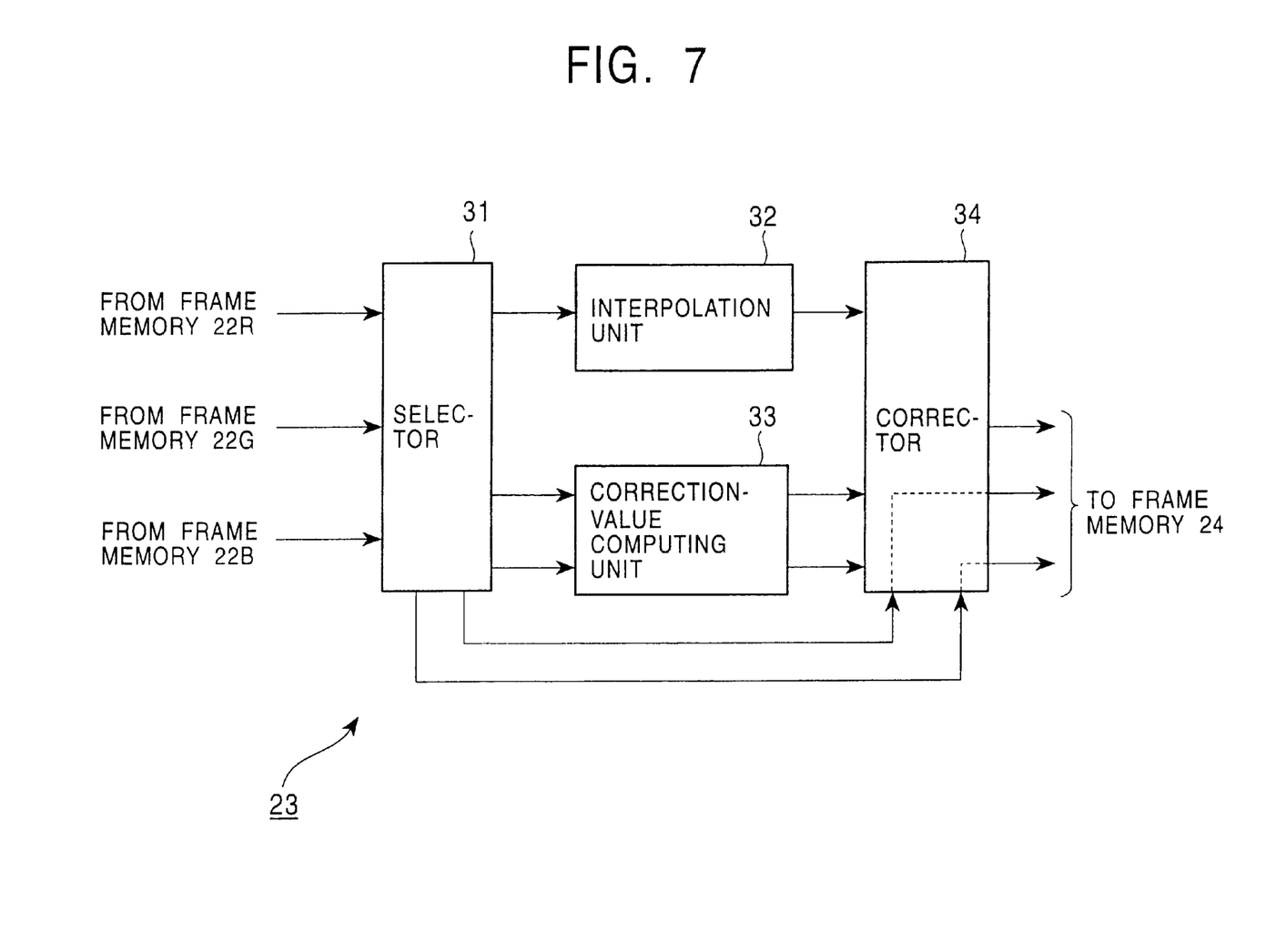
FIG. 7 is a detailed block diagram of generator 23 of FIG. 6.

FIG. 7 shows in detail a block diagram of the generator 23 shown in FIG. 6. In the generator 23, an estimated value of the color component not included in the pixel to be considered is estimated from identical color components of the adjacent pixels, and a predetermined correction value is computed from the other color components. The estimated value is corrected by the correction value whereby a value of the color component not included in the pixel to be considered is generated.

A selector 31 reads from the frame memories 22R to 22B two color components included in the pixel to be considered, and the two color components included in each of eight pixels adjacent the pixel to be considered (pixels on the top left, top, top right, right, left, bottom left, bottom, and bottom right sides of the pixel to be considered). The selector 31 selects the color components not included in the pixel to be considered among the read color components, and supplies them to an interpolation unit 32. The selector 31 also outputs the other color components identical to the color component included in the pixel to be considered to a correction-value computing unit 33. The selector 31 further outputs the two color components included in the pixel to be considered to a corrector 34.

The interpolation unit 32 computes from the color components supplied from the selector 31, the estimated value of the color component not included in the pixel to be considered, and supplies it to the corrector 34. The correction-value computing unit 33 computes from the color components supplied from the selector 31, the correction value for correcting the estimated value output by the interpolation unit 32, and supplies the correction value to the corrector 34. The corrector 34 uses the correction value from the correction-value computing unit 33 to correct the estimated value from the interpolation unit 34, and then determines the corrected estimated value of the color component not included in the pixel to be considered. The corrector 34 supplies the corrected estimated value and the color components included in the pixel to be considered to the frame memory 24.

Next, the processing by the above elements will be described. It is assumed that, in FIG. 4B, one pixel represented by X is used as the pixel to be considered. As shown in FIG. 4B, for example, the pixel represented by X includes G component and B component, and in this case, the selector 31 reads from the frame memories 22R to 22B, two color components included in each of the nine pixels in the dotted-line rectangle shown in FIG. 4B (hereinafter referred to as "pixels to be processed").

Figure 8A:
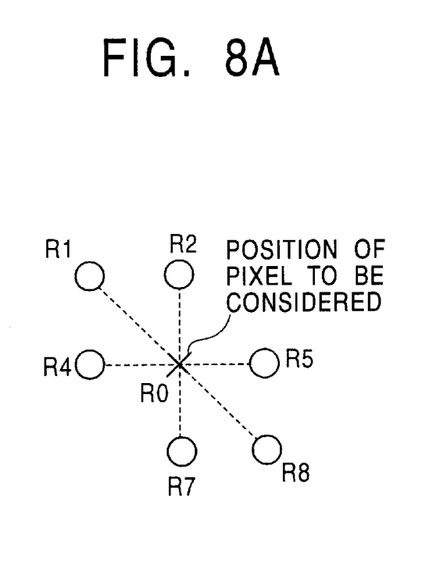
FIGS. 8A–8C illustrate the R, G, B components of pixels to be processed.
Figure 8B:
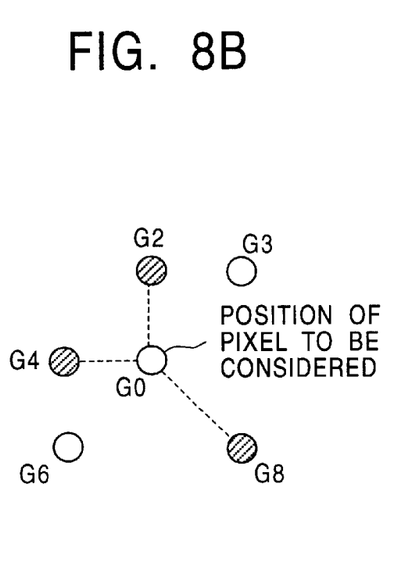
Figure 8C:
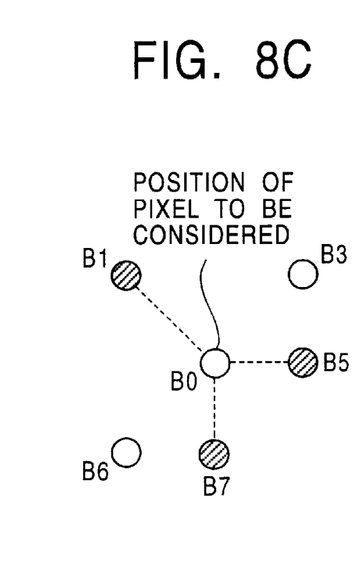

Among the pixels to be processed, six pixels on the top left, top, left, right, bottom, bottom right sides of the pixel to be considered have R components as shown in FIG. 8A. Further, the pixel to be considered and the five pixels on the top, top right, left, bottom left, and bottom right sides of the pixel to be considered have G components as shown in FIG. 8B. And the pixel to be considered and the five pixels on the top left, top right, right, bottom left, and bottom sides of the pixel to be considered have B components as shown in FIG. 8C.

The pixel to be considered is represented by #0, and the pixels on the top left, top, top right, left, right, bottom left, bottom, bottom right sides of the pixel to be considered are represented by #1 to #8, respectively. That is, the R, G and B components of the nine pixels to be processed are represented by adding R, G and B before the corresponding pixel numbers. In this case, the selector 31 selects from the color components of the nine pixels to be processed the color components identical to the color component not included in the pixel to be considered, i.e., the R components when the pixel represented by X in FIG. 4B is used as the pixel to be considered. Namely, the selector 31 selects and outputs R1, R2, R4, R5, R7 and R8 (FIG. 8A) to the interpolation unit 32. The selector 31 also outputs to the correction-value computing unit 33, the other color components —G0, G2 to G4, G6 and G8, and B0, B1, B3 and B5 to B7. The selector 31 further outputs color components of the pixel to be considered (color components included in the pixel to be considered), namely, G0 and B0 to the corrector 34.

As described above, in the transmitter 1 the R, G or B component is periodically eliminated from each pixel constituting the original image and the pattern or order in which the R, G or B component is eliminated is predetermined. Thus, in accordance with the predetermined pattern or order, the selector 31 recognizes the color component not included in the pixel to be considered, and recognizes the color components of each of the eight pixels that are adjacent the pixel to be considered (color components not included in each of the eight pixels).

Figure 9:
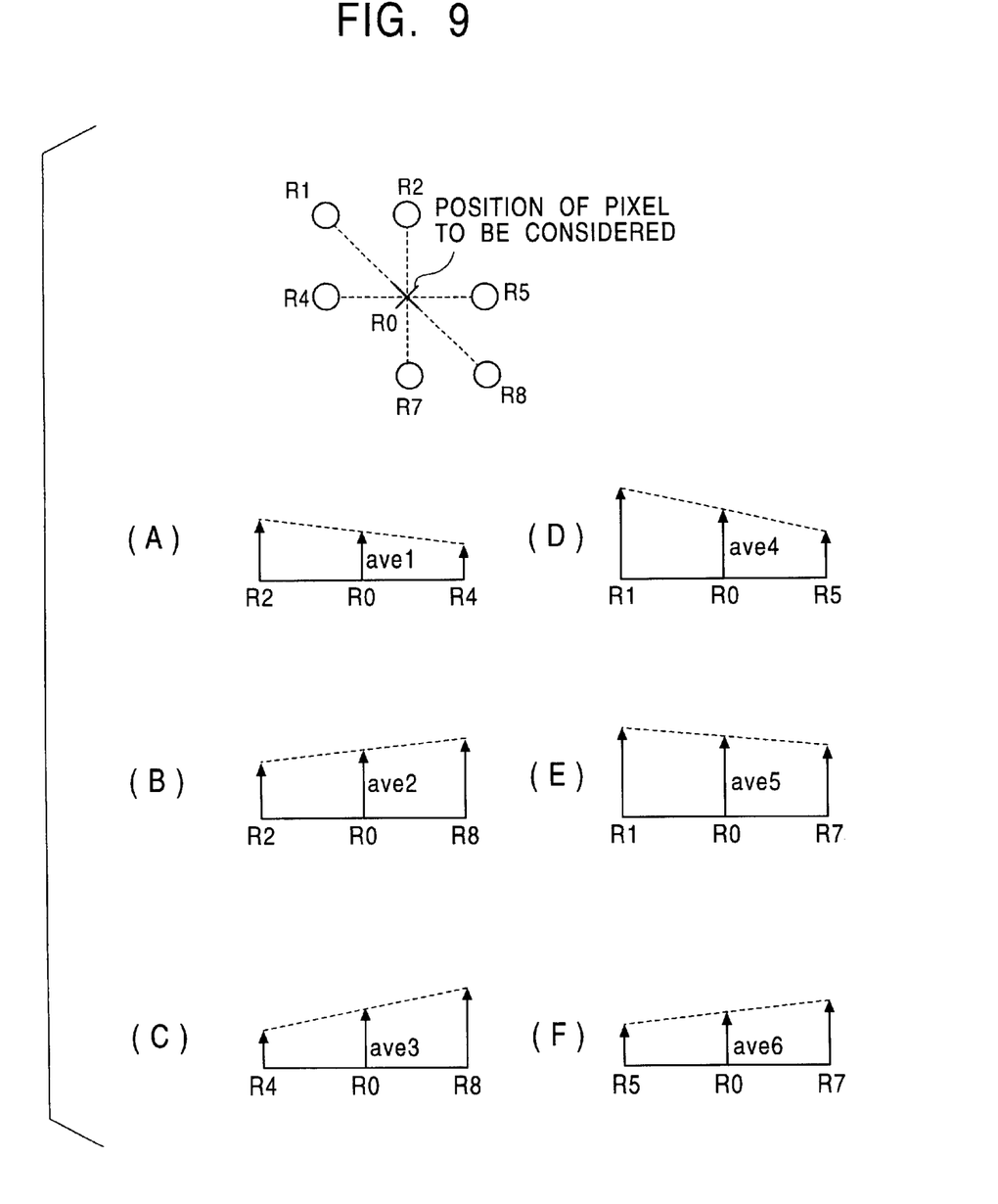
FIG. 9 shows processing by interpolation unit 32 of FIG. 7.

The interpolation unit 32 uses R1, R2, R4, R5, R7 and R8 supplied from the selector 31 to perform an interpolation, thereby finding an estimated value of R0 as a color component not included in the pixel to be considered. For example, the average ave1 ((R2+R4)/2) of R2 and R4 is found as a first estimated value of R0 by the interpolation unit 32 as shown in FIG. 9, part (A). As shown in FIG. 9, part (B), the average ave2 ((R2+R8)/2) of R2 and R8 is found as a second estimated value of R0. As shown in FIG. 9, part (C), the average ave3 ((R4+R8)/2) of R4 and R8 is found as a third estimated value of R0. As shown in FIG. 9, parts (D) to (F), the average ave4 ((R1+R5)/2) of R1 and R5, the average ave5 ((R1+R7)/2) of R1 and R7, and the average ave6 ((R5+R7)/2) of R5 and R7 are found as fourth through sixth estimated values of R0, respectively. The respective first through sixth estimated values ave1 to ave6 are supplied to the corrector 34.

Figure 10:
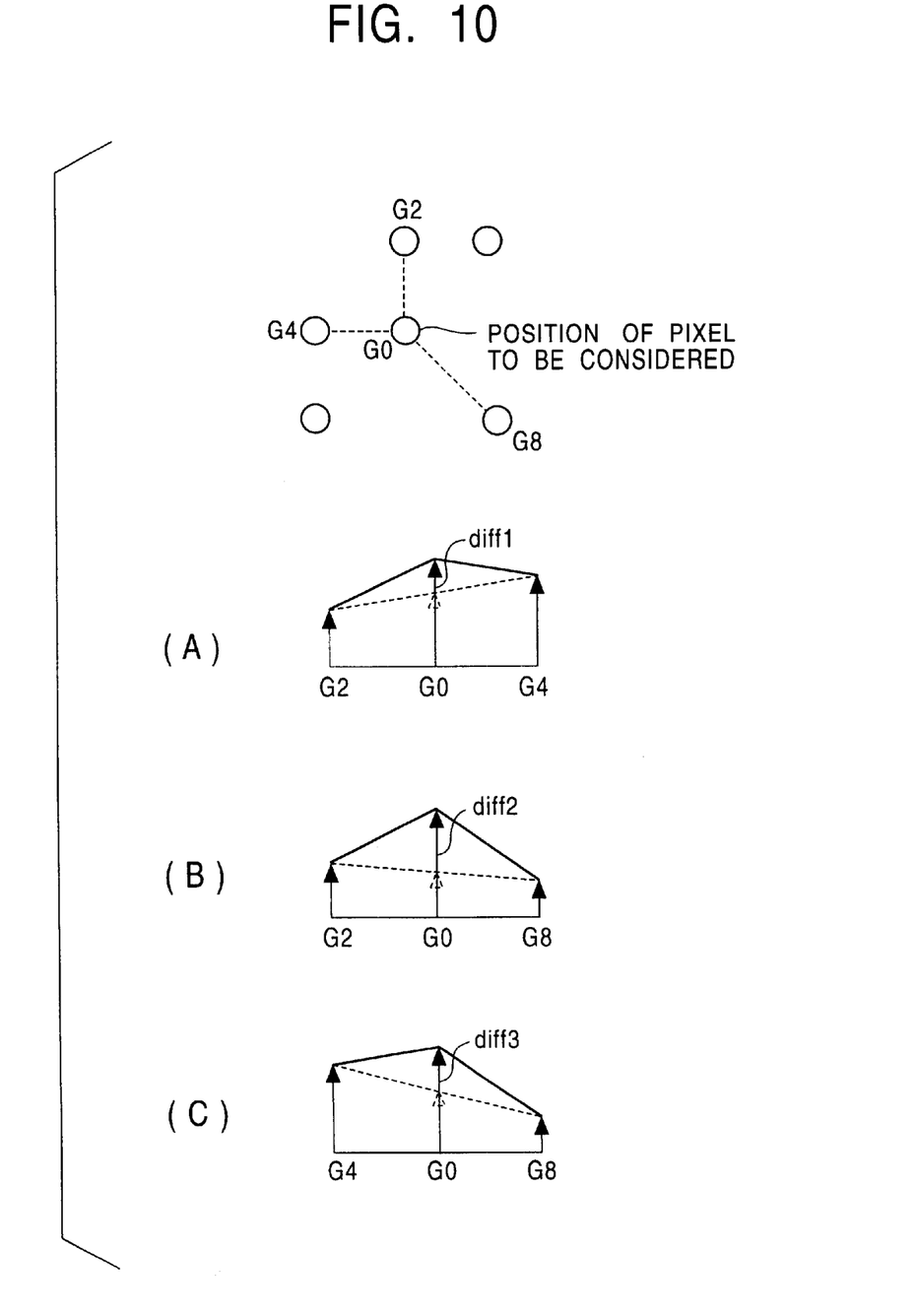
FIG. 10 illustrates processing by correction-value computing unit 33 of FIG. 7.

In addition, the correction-value computing unit 33 computes correction values from G0, G2, G3, G4, G6, G8, B0, B1, B3, B5, B6, B7 supplied from the selector 31 in order to correct the first through sixth estimated values ave1 to ave6 output by the interpolation unit 32. As shown in FIG. 10, part (A), the difference diff1 (G0−(G2+G4)/2) between the G component G0 included in the pixel to be considered and the average of G2 and G4 is computed as a first correction value by the correction-value computing unit 33. As further shown in FIG. 10, part (B), the difference diff2 (G0−(G2+G8)/2) between the G component G0 included in the pixel to be considered and the average of G2 and G8 is computed as a second correction value. As also shown in FIG. 10, part (C), the difference diff3 (G0−(G4+G8)/2) between the G component G0 in the pixel to be considered and the average of G4 and G8 is computed as a third correction value.

Figure 11:
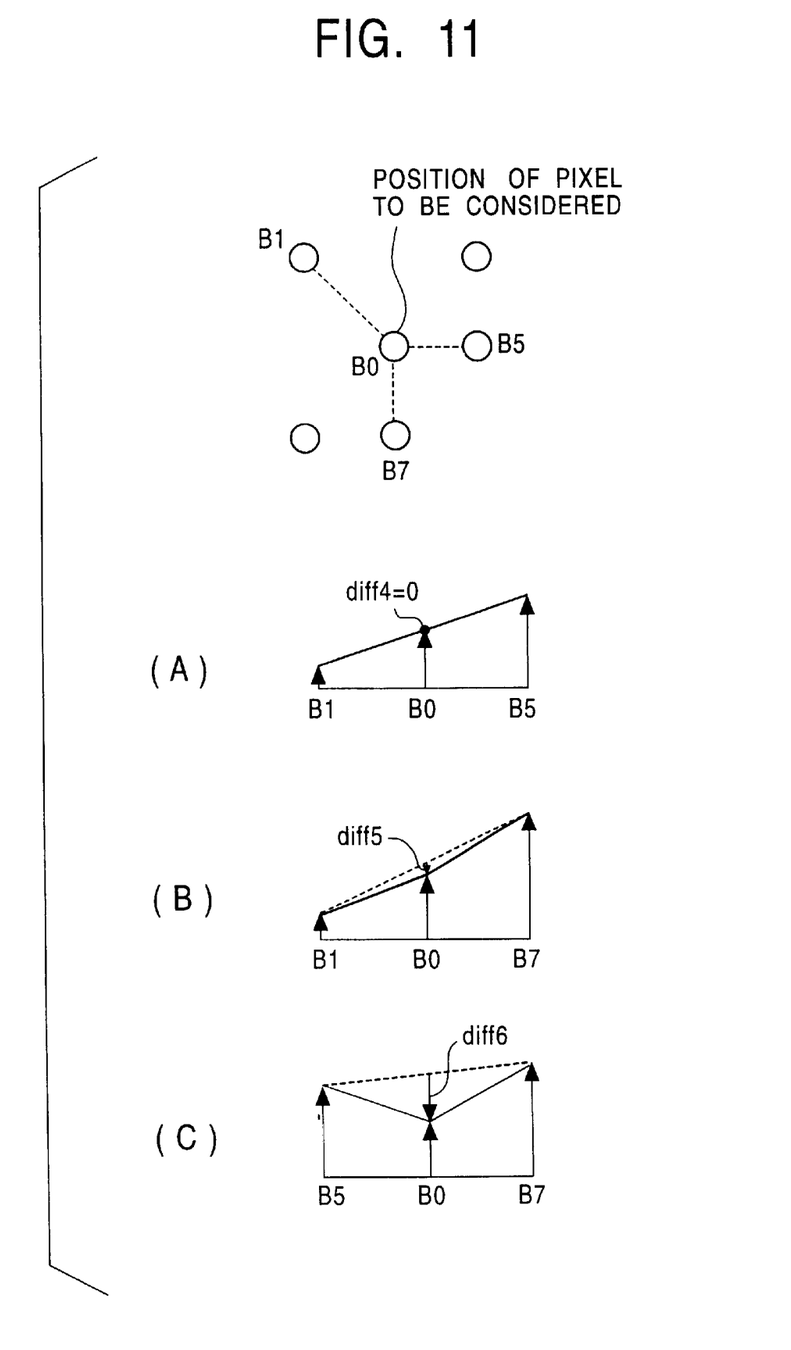
FIG. 11 shows further processing by correction-value computing unit 33 of FIG. 7.

As shown in FIG. 11, part (A), for example, the difference diff4 (B0−(B1+B5)/2) between the B component B0 included in the pixel to be considered and the average of B1 and B5 is computed as a fourth correction value by the correction-value computing unit 33. In FIG. 11, part (B), the average diff5 (B0−(B1+B7)/2) between the B component B0 included in the pixel to be considered and the average of B1 and B7 is computed as a fifth correction value. As further illustrated in FIG. 11, part (C), the difference diff6 (B0−(B5+B7)/2) between the B component B0 included in the pixel to be considered and the average of B5 and B7 is computed as a sixth correction value. In the embodiment shown in FIG. 11, diff4=0 such that the B component B0 included in the pixel to be considered is equal to the average of B1 and B5. The respective first to sixth correction values diff1 to diff6 are supplied to the corrector 34. The corrector 34 uses the first to sixth correction values diff1 to diff6 supplied from the correction-value computing unit 33 to correct the first to sixth estimated values ave1 to ave6 supplied from the interpolation unit 32.

Figure 12A:
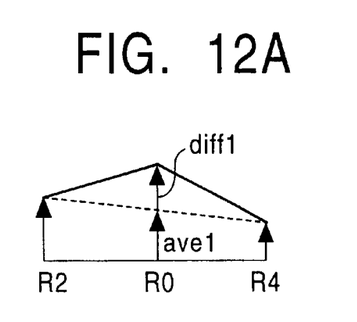
FIGS. 12A–12F are diagrams of processing operations by corrector 34 of FIG. 7.

The corrector 34 corrects the first estimated value ave1 using the first correction value diff1 found from the color component G2 and G4 included, respectively, in the pixel #2 and #4 each having the color component R2 and R4 to find the first estimated value. Specifically, as shown in FIG. 12A, the first correction value diff1 is added to the first estimated value ave1, and the sum is used as a first post-correction estimated value est1.

Figure 12B:
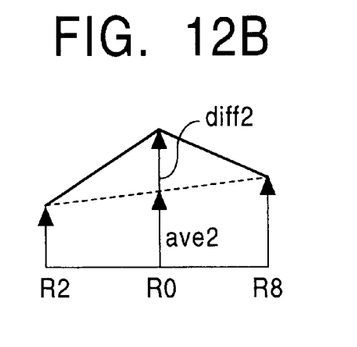
Figure 12C:
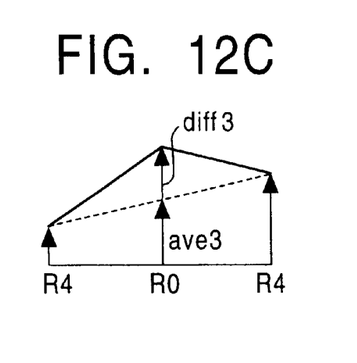
Figure 12D:
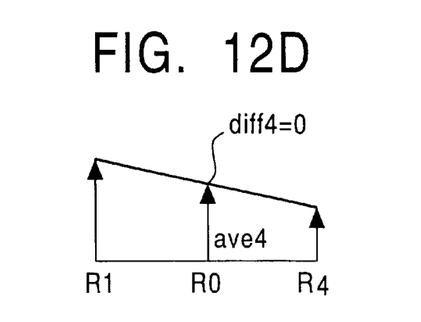
Figure 12E:
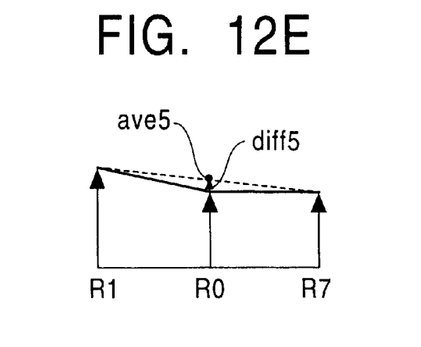
Figure 12F:
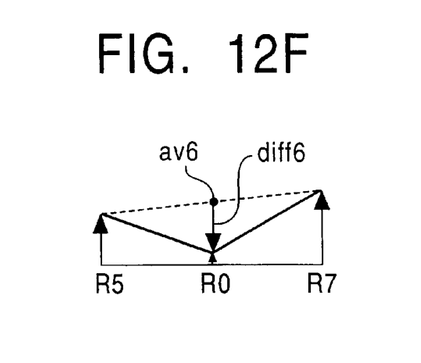

The corrector 34 corrects the second estimated value ave2 using the second correction value diff2 found from the color component G2 and G8 included, respectively, in the pixel #2 and #8 each having the color component R2 and R8 to find the second estimated value. Specifically, as shown in FIG. 12B, the second correction value diff2 is added to the second estimated value ave2, and the sum is used as a second post-correction estimated value est2.

In the same manner, as shown in FIGS. 12C–12F, the third through sixth correction values diff3 to diff6 are added to the third through sixth estimated values ave3 to ave6, respectively, and the sums are used as third through sixth post-correction estimated values est3 to est6.

In addition, the corrector 34 computes the average est ((est1+est2+est3+est4+est5+est6)/6) of the first to sixth post-correction estimated values est1 to est6. This is a final estimated value est of the color component R0 not included in the pixel to be considered #0.

Subsequently, the corrector 34 supplies to the frame memory 24 the estimated value est of the color component R0 as the result of decoding the pixel to be considered #0, together with the color components G0 and B0 from the selector 31.

The generator 23 finds an estimated value in the same way as described above in the case where the color component not included in the pixel to be considered is the G or B component.

As described above, an estimated value of a color component not included in the pixel to be considered is found from identical color components among pixels to be processed, and a correction value computed from other color components is used to correct the estimated value. Thus, a color component not included in each pixel has a large range, whereby the decoded image is obtained that is expressed with more than 256 colors using only 8 bits. Hence, the decoded image can be improved in quality without increase in the amount of data.

In addition, simple averages of pixels to be processed are not used as estimated values for a color component not included in the pixel to be considered. Therefore, by performing the calculation as described above, deterioration in an edge or stripe pattern included in the original image is prevented (suppressed). In the edge or stripe portion, deterioration in the decoded image quality, caused by color shifting, for example, is suppressed. In particular, an edge or stripe pattern formed by brightness (luminance) change can be reproduced (decoded) with high accuracy.

Figure 13:
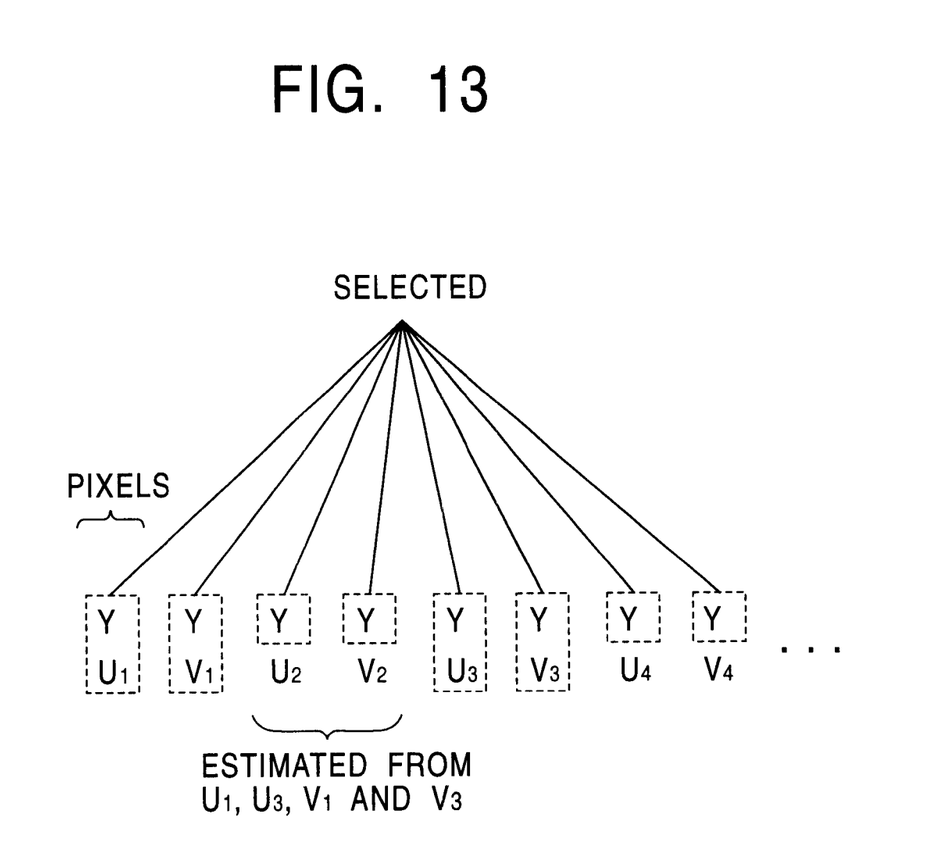
FIG. 13 illustrates operations performed by transmitter 1 and receiver 4 when a YUV image having chrominance and luminance components is processed.

In the above-described embodiments, a 4:4:4 signal is used, but the present invention may be applied to other signals such as 4:2:2 and 4:2:0 signals. In the above-described embodiments, an RGB image is used, but the present invention can be applied to an image having a number of color components like YUV. For example, in the case where a YUV image is used, as shown in FIG. 13, the transmitter 1 can always select a brightness signal Y, and can eliminate color-difference signals U and V every two pixels, while the receiver 4 can estimate (generate) the eliminated color-difference signals from color-difference signals based on the adjacent pixels as described above.

In the foregoing embodiments, an R, G or B component is periodically eliminated from pixels constituting the original image. However, color-component elimination may be performed at random and not periodically. In such a case, the receiver 4 needs information for recognizing which color component is eliminated. As the result, the amount of data increases due to the amount of information needed to determine which color was eliminated.

In the foregoing embodiments, an R, G or B component is eliminated in both the horizontal and vertical directions every three pixels. However, a cycle for eliminating one color component is not limited to every three pixels and a frame cycle can be used, for example. Otherwise, one color component can be sequentially eliminated. However, in a case where color components of one color are collectively eliminated, or color components of another color are collectively left unchanged, decoded image quality may lack uniformity. Accordingly, it is preferable to equally eliminate (or leave unchanged) the respective color components in the entire frame.

In the foregoing embodiments, a selected image is processed by the ADRC. However, a technique for compressing the selected image is not limited to the ADRC.

In the foregoing embodiments, the interpolation unit 32 as shown in detail in FIG. 7 uses the average of color components identical to the color component not included in the pixel to be considered as an estimated value. However, other values can be used as estimated values.

In the foregoing embodiments, the interpolation unit 32 as shown in detail in FIG. 7 uses as an estimated value of a color component not included in a pixel to be considered the average of color components of two adjacent pixels which are identical to the color component not included. However, an estimated value of a color component can be found using not two pixels but one pixel or three pixels or more. In this case, it is preferable to change the pixels used for finding correction values by the correction-value computing unit 33 so as to correspond to the pixels used for finding estimated values of a color component.

In the foregoing embodiments, for each pixel included in the image, one of a plurality of color components is eliminated. However, color-component elimination does not need to be performed for all pixels. It may be performed every two or three pixels, for example.

Moreover, the present invention is particularly effective for an image (so-called natural image) obtained by photographing the actual scene.

The structure and operation as above to which the present invention is applied, can be realized as a computer program used in a general computer as well as a hardware.

According to image encoding apparatus and method to which the present invention is applied, one of a plurality of color components is eliminated and the other remaining color components are selected and output. Therefore, one color component can have a large range without the increase in the amount of image data.

According to image decoding apparatus and method to which the present invention is applied, one eliminated color component is generated based on the color components of the adjacent pixels. Therefore, a decoded image expressed using the number of colors more than a conventional number can be obtained.

In a recording medium to which the present invention is applied, encoded data obtained by eliminating one of a plurality of color components before selecting and outputting the remaining color components are recorded. Therefore, a decoded image having a good quality can be obtained.

What is claimed is:

1. A method for encoding image data including a plurality of pixels, each pixel comprising N color components, said method comprising:
   eliminating one color component in said N color components of a given pixel to select N−1 color components; and
   compression encoding, for said given pixel, only the selected N−1 color components to thereby reduce the amount of bits representing said pixel.

2. The method according to claim 1, wherein each of said N color components is eliminated periodically.

3. The method according to claim 1, wherein one color component is eliminated for each pixel.

4. The method according to claim 1, wherein the selected N−1 color components are encoded for each pixel.

5. Apparatus for encoding image data including a plurality of pixels, each pixel comprising N color components, said apparatus comprising:
   means for eliminating one color component in said N color components of a given pixel to select N−1 color components; and
   means for compression encoding, for said given pixel, only the selected N−1 color components, to thereby reduce the amount of bits representing said pixel.

6. The apparatus according to claim 5, wherein each of said N color components is eliminated periodically.

7. The apparatus according to claim 5, wherein one color component is eliminated for each pixel.

8. The apparatus according to claim 5, wherein the selected N−1 color components are encoded for each pixel.

9. Apparatus for encoding image data including a plurality of pixels, each pixel comprising N color components, said apparatus comprising:
   a selector for eliminating one color component in said N color components of a given pixel to select N−1 color components; and
   a compression unit for compression encoding, for said given pixel, only the selected N−1 color components, to thereby reduce the amount of bits representing said pixel.

10. The apparatus according to claim 9, wherein said selector eliminates each of said N color components periodically.

11. The apparatus according to claim 9, wherein said selector eliminates one color component for each pixel.

12. The apparatus according to claim 9, wherein said compression unit encodes the selected N−1 color components for each pixel.

13. A method for producing a decoded image from encoded data generated by encoding image picture that includes a plurality of pixels, each pixel comprising N color components, the encoded data being generated by encoding N−1 color components selected by eliminating one color component from said N color components, said method comprising:
   decoding the encoded data to generate said N−1 color components for each pixel;
   generating the eliminated one color component based on the generated N−1 color components that are adjacent the eliminated one color component; and producing a pixel based on the generated N−1 color components and the eliminated one color component that has been generated.

14. The method according to claim 13, wherein each of said N color components is periodically eliminated.

15. The method according to claim 13, wherein one color component is eliminated for each pixel.

16. The method according to claim 13, wherein the N−1 color components are encoded for each pixel and said encoded N−1 color components are decoded for each pixel.

17. The method according to claim 13, further comprising:
    estimating a value of the eliminated one color component based on the adjacent color components identical to a color of the eliminated one color component;
    calculating a correction value for correcting the estimated value of the eliminated one color component based on the adjacent color components that are of different color than the eliminated one color component; and
    producing the eliminated one color component by correcting the estimated value using the calculated correction value.

18. Apparatus for producing a decoded image from encoded data generated by encoding image picture that includes a plurality of pixels, each pixel comprising N color components, the encoded data being generated by encoding N−1 color components selected by eliminating one color component from said N color components, said apparatus comprising:
    means for decoding the encoded data to generate said N−1 color components for each pixel;
    means for generating the eliminated one color component based on the generated N−1 color components that are adjacent the eliminated one color component; and
    means for producing a pixel based on the generated N−1 color components and the eliminated one color component that has been generated.

19. The apparatus according to claim 18, wherein each of said N color components is periodically eliminated.

20. The apparatus according to claim 18, wherein one color component is eliminated for each pixel.

21. The apparatus according to claim 18, wherein the N−1 color components are encoded for each pixel and said encoded N−1 color components are decoded for each pixel.

22. The apparatus according to claim 18, further comprising:
    means for estimating a value of the eliminated one color component based on the adjacent color components identical to a color of the eliminated one color component;
    means for calculating a correction value for correcting the estimated value of the eliminated one color component based on the adjacent color components that are of different color than the eliminated one color component; and
    means for producing the eliminated one color component by correcting the estimated value using the calculated correction value.

23. Apparatus for producing a decoded image from encoded data generated by encoding image picture that includes a plurality of pixels, each pixel comprising N color components, the encoded data being generated by encoding N−1 color components selected by eliminating one color component from said N color components, said apparatus comprising:
    a decompression unit for decoding the encoded data to generate said N−1 color components for each pixel; and
    a generator for generating the eliminated one color component based on the generated N−1 color components that are adjacent the eliminated one color component, said generator producing a pixel based on the generated N−1 color components and the eliminated one color component that has been generated.

24. The apparatus according to claim 23, wherein each of said N color components is periodically eliminated.

25. The apparatus according to claim 23, wherein one color component is eliminated for each pixel.

26. The apparatus according to claim 23, wherein the N−1 color components are encoded for each pixel and said encoded N−1 color components are decoded for each pixel.

27. The apparatus according to claim 23, further comprising:
    an interpolation unit for estimating a value of the eliminated one color component based on the adjacent color components identical to a color of the eliminated one color component;
    a correction value computing unit for calculating a correction value for correcting the estimated value of the eliminated one color component based on the adjacent color components that are of different color than the eliminated one color component; and
    a corrector for producing the eliminated one color component by correcting the estimated value using the calculated correction value.

28. A record medium having encoded data stored thereon, the encoded data having been generated by encoding an image and having been prepared by the steps of:
    eliminating one color component in said N color components to select N−1 color components; and
    encoding the selected N−1 color components.

29. A record medium having a recorded signal recorded thereon, said recorded signal including encoded data generated by encoding an image picture including a plurality of pixels, each pixel comprising N color components, the encoded data being generated by encoding N−1 color components selected by eliminating one color component from said N color components, said recorded medium having the encoded data in said recorded signal decoded by the steps:
    decoding the encoded data to generate said N−1 color components for each pixel;
    generating the eliminated one color component based on the generated N−1 color components that are adjacent the eliminated one color component; and
    producing a pixel based on the generated N−1 color components and the eliminated one color component that has been generated.

30. A record medium having an encoding program recorded thereon, said encoding program for encoding image data including a plurality of pixels, each pixel comprising N color components, said encoding program comprising the steps of:
    eliminating one color component in said N color components of a given pixel of selected N−1 color components.
    compression encoding, for said given pixel, only the selected N−1 color components, to thereby reduce the amount of bits representing said pixel.

31. A record medium having a decoding program recorded thereon, said decoding program producing a decoded image from encoded data generated by encoding an image picture including a plurality of pixels, each pixel comprising N color components, the encoded data being generated by encoding N−1 color components selected by eliminating one color component from said N color components, said decoding program comprising the steps of:

decoding the encoded data to generate said N−1 color components for each pixel;

generating the eliminated one color component based on the generated N−1 color components that are adjacent the eliminated one color component; and     producing a pixel based on the generated N−1 color components and the eliminated one color component that has been generated.

32. A method for encoding image data including a plurality of pixels, each pixel comprising N color components, said method comprising:

eliminating one color component in said N color components of a given pixel to select N−1 color components; and     encoding, for said given pixel, only the selected N−1 color components;

wherein at least one of said color components is eliminated on a random basis.

33. A method for encoding image data including a plurality of pixels, each pixel comprising N color components, said method comprising:

eliminating one color component in said N color components to select N−1 color components; and     encoding the selected N−1 color components;

wherein each of said N color components is eliminated periodically on an alternating basis.

34. The method according to claim 33, wherein each color component is eliminated every N pixels.

35. The method according to claim 34, wherein N equals three, such that first second and third color components are eliminated for first, second and third successive pixels, respectively, in a repetitive fashion.

36. The method according to claim 35, wherein said color components are red, blue and green.

37. A method for producing a decoded image from encoded data generated by encoding image picture that includes a plurality of pixels, each pixel comprising N color components, the encoded data being generated by encoding N−1 color components selected by eliminating one color component from said N color components, said method comprising:

decoding the encoded data to generate said N−1 color components for each pixel;

generating, for a given pixel, the eliminated one color component for that pixel based at least on an average of values for the color component identical to the eliminated color component, in pixels that are adjacent to the given pixel; and     producing the given pixel based on the generated N−1 color components for that pixel and the eliminated one color component that has been generated.

38. A method for encoding image data of a plurality of pixels representing a picture, each pixel comprising N color components, said method comprising:

eliminating a first color component of said N color components for each pixel of a first subset of said plurality of pixels, to thereby select N−1 color components for pixels of said first subset;

eliminating a second color component of said N color components for each pixel of a second subset of said plurality of pixels to thereby select N−1 color components for pixels of said second subset; and     encoding, for each pixel of said first and second subsets of pixels, the selected N−1 color components.

39. The method according to claim 38, wherein N equals three, and said method further comprises:

eliminating a third color component of said N color components for each of a third subset of said plurality of pixels to thereby select N−1 color components of said third subset of pixels; and     encoding, for each pixel of said third subset of pixels, the selected N−1 color components thereof.

\* \* \* \* \*